United States Patent [19]
Fulton

[11] 3,825,359

[45] July 23, 1974

[54] RELEASABLE MOUNTING FOR CYLINDRICAL OBJECTS

[75] Inventor: Clyde E. Fulton, Pekin, Ill.

[73] Assignee: Caterpillar Tractor Co., Peoria, Ill.

[22] Filed: July 14, 1972

[21] Appl. No.: 272,056

[52] U.S. Cl................................ 403/192, 403/350
[51] Int. Cl.............................................. F16b 2/18
[58] Field of Search............ 287/DIG. 8, 118, 52.09, 287/23; 285/178, 175; 403/192, 200, 350, 351

[56] References Cited

UNITED STATES PATENTS

| | | | |
|---|---|---|---|
| 506,039 | 10/1893 | Freeman........................ | 287/DIG. 8 |
| 954,957 | 4/1910 | Harriman et al............ | 287/52.09 X |
| 3,036,872 | 5/1962 | King, Jr. et al............. | 287/52.09 X |

FOREIGN PATENTS OR APPLICATIONS

| | | | |
|---|---|---|---|
| 773,626 | 9/1934 | France.............................. | 285/178 |

Primary Examiner—Andrew V. Kundrat
Attorney, Agent, or Firm—Phillips, Moore, Weissenberger, Lempio & Stabala

[57] ABSTRACT

A compact economically manufactured mounting device provides for disengageably fastening cylindrical objects, such as electrical circuit elements or the like, to a support member. A tubular base is attachable to the support and has an internal passage for receiving a portion of the cylindrical object to be mounted thereon. The end of the base into which the cylindrical object extends has an annular outer surface which is eccentric relative to the internal passage. A locking ring encircles another portion of the cylindrical object and is abutted against the end of the base, the locking ring having an annular inner surface which is also eccentric relative to the passage through the ring and which is fitted against the eccentric outer surface of the base. Turning of the ring relative to the base then tightly clamps the base, locking ring and cylindrical object together.

2 Claims, 3 Drawing Figures

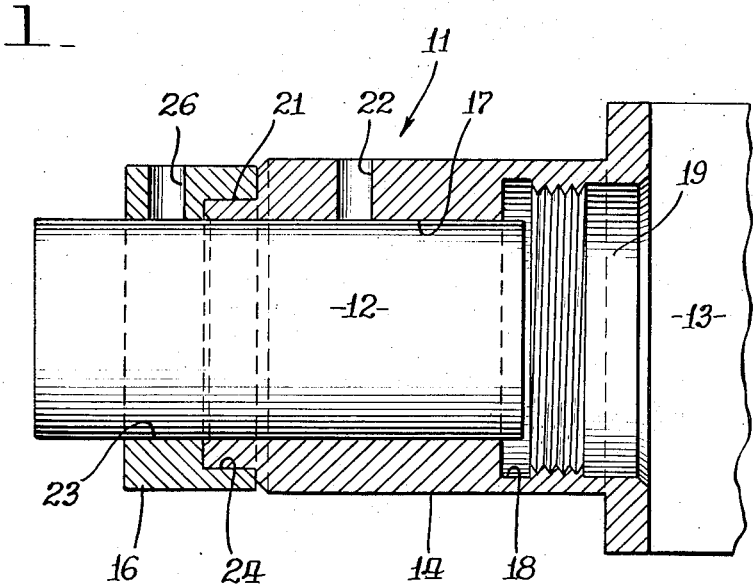
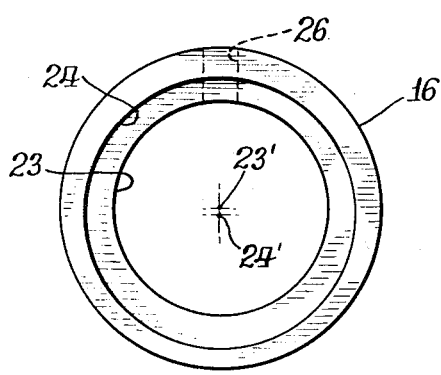
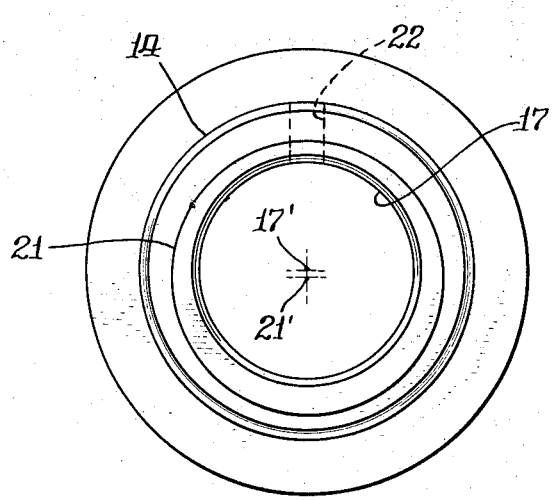

RELEASABLE MOUNTING FOR CYLINDRICAL OBJECTS

BACKGROUND OF THE INVENTION

This invention relates to disengageable fastening devices and more particularly to releasable means for attaching cylindrical objects to associated structure.

In the design of a variety of mechanisms, electrical circuits, and the like, situations are often encountered in which a cylindrically shaped object must be fastened to a supporting member without requiring that there be threads or other projections or indentations on the object to facilitate fastening. Under these conditions, the fastening device must engage the object either by friction or through adhesives, soldering, welding or the like. Often the objects are of a nature that requires occasional replacement necessitating that the fastening means be disengageable. Where adhesives or the like are used to secure the object to the mounting means this necessitates that at least a portion of the mounting means itself be removed with the object. This can be a source of significant maintenance costs in many mechanisms.

While a variety of mounting means have been devised which rely on frictional gripping of the cylindrical object, these have heretofore tended to have several undesirable effects either in terms of cost or in damage or distortion of the object. Set screws, for example, concentrate stress at a particular point on the object and in many instances there is a serious risk of damage to the object. Collets distribute stress but tend to be complex or require expensive machining and are therefore relatively expensive. Threaded fasteners are often undesirable as it may be expensive, inconvenient or impractical in some cases to machine threads on the object which is to be mounted.

SUMMARY OF THE INVENTION

This invention provides for releasable fastening of cylindrical objects or the like to other structure by using a base element which is attachable to such structure and which has a passage in which a portion of the cylindrical object may be inserted. A locking ring element fits around an adjacent portion of the object and is abutted against the base. One of the two elements has an annular outer surface which is eccentric relative to the passage through such element while the other element has a matching annular inner surface which is also eccentric relative to the passage therethrough. Thus with the annular surfaces of the two elements abutted, turning of the ring relative to the base exerts a clamping action which tightly links the object, ring and base together. Rotation of the ring in the opposite direction readily relieves the clamping force enabling the object to be withdrawn.

Accordingly, it is an object of this invention to provide a simple, economical and durable mounting means for fastening cylindrical objects to associated structure which fastening may readily be released and which does not require that indentations, projections, threads or the like be formed on the object for fastening purposes and which does not exert concentrated stresses on the object.

The invention, together with further objects and advantages thereof, will best be understood by reference to the following description of a preferred embodiment taken in conjunction with the accompanying drawing.

BRIEF DESCRIPTION OF THE DRAWING

In the accompanying drawing:

FIG. 1 is an axial section view of a component mounting device embodying the invention including a tubular base and a locking ring which is fitted thereon, FIG. 2 is an end view of the tubular base of the assembly of FIG. 1 shown separated therefrom, and FIG. 3 is an end view of the locking ring of the assembly of FIG. 1 shown separated therefrom.

DESCRIPTION OF A PREFERRED EMBODIMENT

Referring initially to FIG. 1 of the drawing, a fastening means 11 is shown for mounting a cylindrical object 12 on supporting member 13 which in this example is a round shaft. Object 12 in this particular example is an electrical transducer of the form employed in the apparatus of copending application Ser. No. 154,386 of William H. Belke et al. filed June 18, 1971 for FLOATING THICKNESS MONITOR and assigned to the assignee of the present application and is merely a typical example of an object which may be retained on support means by the present invention. In general, the invention is adaptable to any objects which are essentially cylindrical or have a cylindrical portion through which mounting is to be accomplished. Similarly the supporting structure to which the object is to be fastened may take a variety of forms, the shaft 13 being merely a typical example.

The fastening means 11 is formed by two elements including a tubular base 14 and a separable locking ring 16. Referring now to FIGS. 1 and 2 in conjunction, base 14 has an axial passage 17 having a diameter conforming to that of the object 12 which is to be mounted on member 13 whereby an end portion of the object may be inserted into the passage in substantially coaxial relation therewith. Base 14 is further provided with means for attachment to support member 13 which means may take a variety of forms and in this example consists of an internally threaded counterbore 18 for engagement with an externally threaded post 19 formed on the end of member 13. In other instances, base 14 may be secured to supporting member 13 by other known fastening techniques such as bolts, screws, adhesives, soldering, welding and the like.

At the end remote from supporting member 13, base 14 is provided with an annular outer surface 21 which is eccentric relative to passage 17 and the axis of object 12. Thus, as best seen in FIG. 2 in particular, the center of curvature 21' of outer surface 21 is slightly displaced from the center of curvature 17' of passage 17. For reasons which will be apparent in connection with the description of operation of the fastening means 11, clamping action is enhanced if the displacement between centers 17' and 21' is kept to a minimum within the limit imposed by the possible dimensional variations in the diameters of the several elements and the degree of resistance to deformation exhibited by the object 12. The amount of eccentricity may be increased where dimentional tolerances are wide or where the object 12 offers little resistance to radial deformation.

Since the base 14 in this particular example is threaded onto supporting structure 13, a radially directed bore 22 is provided in the wall of the base to facilitate tightening. A suitable tool may be inserted into the bore 22 and used as a lever for this purpose.

Referring now to FIGS. 1 and 3 in combination, locking ring 16 also has an axial passage 23 which conforms in diameter with passage 17 and object 12 whereby the ring may fit around object 12 and abut base 14. At the end which abuts base 14, locking ring 16 is provided with an annular inner surface 24 conforming in diameter with surface 21 of base 14 and which fits thereagainst when the ring 16 is abutted against base 14. As best seen in FIG. 3, the center of curvature 24' of ring surface 24 is displaced from the center of curvature 23' of ring bore 23 in a manner similar to that previously described for the curvature centers of base 14. Thus ring surface 24 is eccentric relative to the passage 23 through the ring.

In operation, with base 14 secured to supporting member 13, the locking ring 16 is fitted onto the base with ring surface 21 being disposed against base surface 24. Object 12 may then be inserted into passages 23 and 17 or alternately, the object may be emplaced in passage 17 prior to fitting of the ring on the base. After ring 16 has been fitted onto base 14 in this manner and after object 12 has been emplaced, the ring is turned angularly. To facilitate tightening a radially directed bore 26 may be provided in the ring 16 to receive any suitable tool which may be used as a lever, it being apparent that other means for facilitating turning of the ring may be provided if desired.

The turning of the ring 16 causes the ring to shift radially relative to base 14 and thereby generate radial forces between the ring, base and object 12 which have the effect of tightly clamping the three elements together. Frictional forces between the abutting surfaces 21 and 24 and the other abutting surfaces of the ring 16, base 14 and object 12 then resists counter rotation of the ring with the result that the object remains securely held in place. However, clamping force may readily be relieved by forced counter rotation of the ring 16. The object 12 may then readily be removed and the fastening means 11 may be reused to remount the same object or a replacement object as desired.

Ring 16 should be at a particular angular orientation relative to base 14 when it is desired to insert or remove object 12, specifically the orientation at which centers of curvature 21' and 24' are coincident. While this position can be determined by experimentation, operation is greatly facilitated if markings are provided on ring 16 and base 14 to designate the unlocked position of the ring on the base. In this embodiment such marking is provided by the radial bores 22 and 26 of the base and ring respectively which are located to be in parallel relationship when the ring is at the unlocked orientation. Thus the bores serve a dual function in facilitating operation of the assembly.

While in this embodiment of the invention, base 14 is provided with an eccentric outer surface which fits into an eccentric inner surface of ring 16, the reverse arrangement may also be employed in which an eccentric outer surface on the locking ring fits into an eccentric inner surface on the tubular base.

While the invention has been described with respect to a particular example, it will be apparent that many variations and modifications are possible and it is not intended to limit the invention except as defined in the following claims.

What is claimed is:

1. Means for fastening an object to a support member, said object having a smooth surfaced cylindrical end portion, comprising:
   a tubular base having a passage therein for receiving said smooth surfaced end portion of said object and having means for attachment to said support member, and
   a locking ring having a passage for also receiving said smooth surfaced end portion of said object and having an end movable into abutment with an end of said base,
   one of said base and said ring having a continuous annular outer surface adjacent to said end thereof which outer surface is eccentric with respect to said passage thereof and the other of said base and said ring having a continuous annular inner surface which is eccentric with respect to said passage thereof,
   whereby said object may be retained at said supporting member by fitting said ring against said base with said outer and inner surfaces in abutment and then rotating said ring relative to said base,
   means defining a visible mark on said ring and means defining a visible mark on said base for facilitating positioning of said ring on said base with the centers of curvature of said eccentric inner and outer surfaces in coincidence, wherein said means defining a visible mark on said ring is also a means for facilitating turning of said ring relative to said base, and said tubular base is attached to said support member by threaded means and wherein said means defining a visible mark on said tubular base is a radially directed tool receiving element therein for facilitating mounting of said base on said support member as well as for facilitating positioning of said ring of said base.

2. The combination defined in claim 1 wherein said means defining a visible mark on said ring is a radially directed bore therein.

* * * * *